United States Patent [19]

Peters

[11] Patent Number: 4,994,526
[45] Date of Patent: Feb. 19, 1991

[54] TELECHELIC POLYISOBUTYLENE AND BLOCK COPOLYMER DERIVATIVES

[75] Inventor: Edward N. Peters, Lenox, Mass.

[73] Assignee: General Electric Company, Mt. Vernon, Ind.

[21] Appl. No.: 328,267

[22] Filed: Mar. 24, 1989

Related U.S. Application Data

[62] Division of Ser. No. 83,120, Aug. 10, 1987, Pat. No. 4,845,158.

[51] Int. Cl.$^5$ .................. C08G 64/00; C08G 63/64; C08G 69/44; C08G 69/26
[52] U.S. Cl. ........................... 525/146; 525/152; 525/167; 525/180; 525/184; 525/332.8
[58] Field of Search ............... 525/146, 152, 167, 180, 525/184, 332–338

[56] References Cited

U.S. PATENT DOCUMENTS

| | | | |
|---|---|---|---|
| 3,392,154 | 7/1968 | Baldwin | 525/123 |
| 4,276,394 | 6/1981 | Kennedy et al. | 525/245 |
| 4,316,973 | 2/1982 | Kennedy | 525/333.7 |

OTHER PUBLICATIONS

Wondraczek and Kennedy, *Polymer Bulletin*, vol. 2 (1980) pp. 675–682.

Liao and Kennedy, *Polymer Bulletin*, vol. 7 (1982) pp. 233–240.

*Primary Examiner*—John C. Bleutge
*Assistant Examiner*—Vasu S. Jagannathan
*Attorney, Agent, or Firm*—Martin B. Barancik; Joseph T. Eisele

[57] ABSTRACT

Block copolymers which include polyisobutylene chain moieties of the formula:

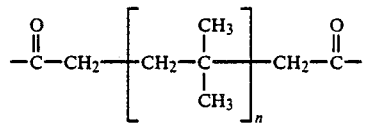

wherein n is an integer such that the moiety has a molecular weight contribution of from 5,000 to 30,000 Daltons as determined by gel permeation chromatography are obtained by block copolymerization of appropriate compounds of the formula:

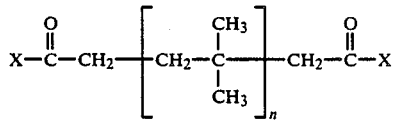

wherein n is as defined above and X represents hydroxyl, halogen or alkoxy, with polycarbonates, polyesters, polyamides, poly(ester-amides), polyarylates, polyetherimides or monomer precursors thereof. The block copolymers are useful thermoplastic molding compositions.

11 Claims, No Drawings

TELECHELIC POLYISOBUTYLENE AND BLOCK COPOLYMER DERIVATIVES

CROSS-REFERENCE TO RELATED APPLICATION

This application is a division of U.S. patent application Ser. No. 07/083,120 filed Aug. 10, 1987 and now issued as U.S. Pat. No. 4,845,158.

BACKGROUND OF THE INVENTION

1. Field of the Invention

The invention relates to difunctional, low molecular weight polyisobutylene polymers bearing terminal functional groups, their method of preparation and use in the synthesis of block copolymers.

2. Brief Description of the Prior Art

Kennedy describes in U.S. Pat. No. 4,316,973 a class of telechelic polymers of the general formula:

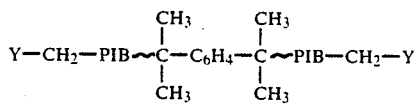

wherein PIB is a divalent polyisobutylene moiety and Y represents one of the monovalent groups of the formulae:

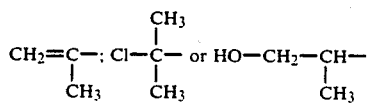

These polymers have been found useful as soft segment components of certain block copolymers. For example, the U.S. Pat. No. 4,276,394 issued to Kennedy et al. describes the halogenated species as being usefully incorporated into a polystyrene elastomer. Also, Wondraczek and Kennedy described the synthesis of nylon-polyisobutylene-nylon triblock copolymers employing the hydroxyl-terminated polyisobutylene species; see Polymer Bulletin 2, 675-682 (1980) published by Springer-Verlag. The same hydroxyl-terminated species was incorporated into a block copolymer of polyisobutylene and polycarbonate; see Liao and Kennedy, Polymer Bulletin 7, pp. 233-240 (1982).

The polyisobutylene polymers of the present invention are distinguishable from the prior art polymers described above and possess advantageous physical properties, such as a higher degree of thermal stability, not associated with the prior art materials.

Baldwin, in U.S. Pat. No. 3,392,154 described the desirability of obtaining relatively low molecular weight, carboxy-terminated difunctional polymers of polyisobutylene. However, the process described, ozonolysis of a butyl rubber followed by oxidation or reduction of the product of ozonolysis, apparently did not result in a difunctional, carboxy-terminated polymer as would be evidenced by a curable mastic. As stated by Baldwin, "it is difficult to approach the objective of two functional groups per polymer molecule by the process of the invention when the unsaturation in the chain is not of type II". A type II copolymer is not inclusive of isobutylene-isoprene copolymer (butyl rubber).

By the method of the present invention, poly(isobutylene co-isoprene) or poly(isobutylene-co-butadiene) is oxidized to obtain carboxy-terminated, difunctional polymers, useful in a wide variety of applications.

SUMMARY OF THE INVENTION

The invention comprises a polymer of the formula:

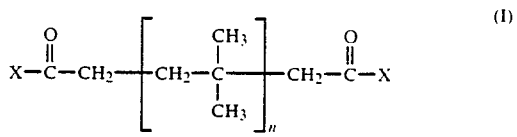

wherein X is selected from the group consisting of halogen, hydroxyl and alkoxy and n is an integer such that the polymer has a weight average molecular weight (Mw) within the range of from 5,000 to 30,000.

The term "halogen" is used herein in its commonly accepted sense as being embracive of chlorine, bromine and iodine.

The term "alkoxy" is used herein to mean the monovalent group of the formula:

—O—Alkyl

Preferably alkyl is represented by lower alkyl of 1 to 4 carbon atoms such as methyl, ethyl, propyl, butyl and isomeric forms thereof.

The polymers of the formula (I) given above are useful prepolymers in the preparation of a wide variety of block co-polymer resins. The invention also comprises the block co-polymers and their uses as will be detailed more fully hereinafter. The polymers (I) are also useful as acid curing agents for epoxy resins, employing known curing technique.

The invention also comprises a method of preparing the polymers of formula (I), which comprises oxidizing poly(isobutylene-co-isoprene) or poly(isobutylene-co-butadiene).

DETAILED DESCRIPTION OF THE PREFERRED EMBODIMENTS OF THE INVENTION

The polymer compounds of the invention having the formula (I) given above are telechelic, i.e., terminally functional polymers which may be incorporated into block co-polymers through condensation co-polymerization with reactable monomers or pre-polymers having active (labile) hydrogen atoms. The product block co-polymers have a wide variety of uses, as will be described more fully hereinafter.

The polymer compounds of the formula (I) given above wherein X represents a hydroxyl group are dicarboxylic acids, useful as a diacid reactant in the preparation of a wide variety of block copolymers which will be described in greater detail below. The dicarboxylic acids of formula (I) may be prepared by the method of the invention, which comprises oxidizing the double bonds in poly(isobutylene-co-isoprene) or poly(isobutylene-co-butadiene). The oxidation proceeds in accordance with the schematic formulae:

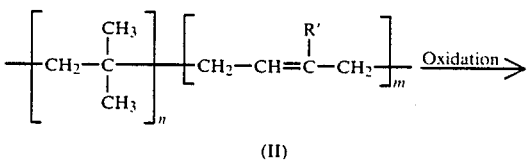

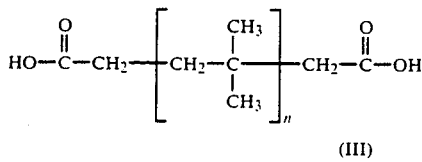

(III)

wherein n is as defined previously, m represents an integer such that m and n together provide the polymer of which the moiety of formula (II) is a repeating unit, with a Mw value of from 50,000 to 500,000. Generally, m is an integer of about one-tenth the value of n. The symbol R' in the formula (II) represents one of hydrogen and methyl. The polymers having repeating units of the formula (II) are well known compounds and are the commercially available poly(isobutylene-co-butadiene) and poly(isobutylene-co-isoprene) copolymers commonly referred to in the art as "butyl rubber". They may be prepared by the method described in U.S. Pat. No. 2,356,128.

The oxidation may be carried out by heating the poly(isobutylene-co-butadiene), poly(isobutylene-co-isoprene) or mixtures thereof in the presence of an oxidizing agent such as dichromate, alkaline permanganate and preferably nitric acid. Advantageously the oxidation is carried out in the presence of an inert organic solvent for the copolymer starting material. The term "inert organic solvent" is used herein to mean an organic solvent that does not enter into or otherwise adversely affect the desired course of the reaction. Representative of inert organic solvents which may be employed in the oxidation are hydrocarbon solvents such as n-hexane, n-octane and the like. Any proportion of solvent may be employed, preferably sufficient to dissolve the starting polymer.

In a preferred embodiment method of the invention, the starting rubber polymer (II) is dissolved in the inert organic solvent and nitric acid is added slowly, in a molar excess (preferably a 4 to 10 X molar excess), with stirring of the reactants.

Although a wide range of temperature and pressure conditions may be employed in the oxidation process of the invention, the temperature is advantageously within the range of from about 50° to 150° C.; preferably 60° to 100° C. The pressure employed may be subatmospheric or super-atmospheric; preferably atmospheric.

Progress of the oxidation may be followed by employment of conventional analytical technique. For example, disappearance of the unsaturated bonds in the starting polymers may be followed by infra-red analytical technique.

Upon completion of the oxidation, the reaction mixture may be allowed to cool to room temperature, washed with water to remove residual oxidizing agent and the desired polymers of formula (III) separated by precipitation following conventional precipitation techniques and procedure. However, it is not necessary that the polymeric dicarboxylic acids of the formula (III) be isolated from the neutralized reaction mixture to be useful. The crude product mixture may be employed, for example, to prepare the polymeric diacyl halides and the polymeric dialkoxy compounds of formula (I) hereinafter described more fully without first separating the dicarboxylic acid polymer of the formula (III).

Polymer compounds of the invention having the formula (I) wherein X represents halogen are diacyl halides, which may be prepared by reaction of the polymeric dicarboxylic acids of formula (III) with a phosphorus halide; see for example the general procedure described by Cloke et al., J.A.C.S., 53, 2794 (1931). In general, a phosphorus trihalide is employed in molar excess over the dicarboxylic acid. In a preferred embodiment of the invention, the halide is chloride and the diacyl chloride of formula (I) is prepared by the action of a molar excess of thionyl chloride on the polymeric dicarboxylic acid of formula (III), in the presence of a catalytic proportion of pyridine and an inert organic solvent for the compound of formula (III) as described above. The reaction is well known and may be carried out by the method described by Ralls et al., J.A.C.S., 77, 6073 (1955). Most preferably the catalyst is dimethylformamidinium chloride which may be formed in situ in the reaction mixture by employing dimethylformamide as a solvent for the thionyl chloride in an excess proportion of about 10 percent of an equivalent of dimethylformamide to thionyl chloride; see the method of Zollinger et al., Helv. Chim. Acta. 42, 1653 (1959).

The carboalkoxy terminated polymers of the formula (I) given above wherein X represents alkoxy may be prepared by esterification, employing known methods, of the polymeric dicarboxylic acids or the diacyl halides of the formula (I) given above. For example, the esterification can be carried out by esterifying the dicarboxylic acid or the diacyl halide of formula (I) with an alcohol of the formula:

Alkyl—OH (IV)

wherein alkyl is as defined herein. The esterification conditions are conventional and well known. In general, the polymeric dicarboxylic acid (I) may be refluxed with a molar excess of the alcohol (IV) in the presence of a mineral acid. A convenient synthesis of polymeric diester from the polymeric diacyl halide may be carried out by the Schotten-Baumann reaction [C. Schotten, Ber. 17, 2544 (1884)]. In a preferred method, the polymeric diacyl halide is esterified with the sodium alcoholate of the alcohol of formula (IV) in the presence of an inert organic solvent as previously defined.

The polymer compounds of the formula (I) given above are telechelic and difunctional, possessing terminal groups reactive in condensation polymerizations (also termed "step-reaction polymerizations") to obtain a wide variety of block copolymers. For example, as an acid reactant in admixture with appropriate dicarboxylic acid monomers, the polymers of the formula (I) may be co-condensed with polyols to obtain co-polyesters, polyester carbonates and polyethers. Condensed with polymers having condensable functional groups such as acid or hydroxyl groups, there may be obtained block-copolymers such as block-copolymers of polycarbonates, polyetherimides, polyarylates and the like.

POLYCARBONATE—POLYISOBUTYLENE BLOCK COPOLYMERS

Polycarbonate block copolymers of the prepolymer compounds of the invention having the formula (I) given above may be obtained by the copolymerization of the compounds (I) with conventionally employed polycarbonate resin precursors. The polycarbonate—polyisobutylene copolymer product resins of the invention so obtained comprise the polymerized reaction products of (i) at least one dihydric phenol;
(ii) a carbonate precursor; and
(iii) a polymer compound of the formula (I).

The copolymer resin obtained may be represented by those having recurring or repeating structural units of the formula:

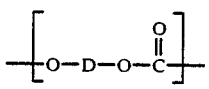 (V)

wherein D is a divalent aromatic radical of the dihydric phenol employed in the polymerization reaction.

The recurring or repeating units of the formula (V) are interrupted by at least one divalent moiety of the formula:

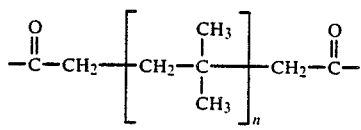 (VI)

wherein n is as defined previously.

The polycarbonate—polyisobutylene block copolymers of the invention may be prepared by known, conventional methods such as is described in the U.S. Pat. Nos. 3,028,365; 3,334,154; 3,275,601; 3,915,926; 3,030,331; 3,169,121; 3,027,814; and 4,188,314, all of which are incorporated herein by reference thereto. In general, the preparation may be carried out by interfacial polymerization or phase boundary separation, transesterification, solution polymerization, melt polymerization, interesterification, and like processes. Interfacial polymerization is preferred.

Although the preparative processes may vary, several of the preferred processes typically involve dissolving or dispersing the reactants in a suitable water immiscible solvent medium and contacting the reactants with a carbonate precursor, such as phosgene, in the presence of a suitable catalyst and an aqueous caustic solution under controlled pH conditions. The most commonly used water immiscible solvents include methylene chloride, 1,2-dichloroethane, chlorobenzene, toluene, and the like. A molecular weight regulator, i.e., a chain stopper, is generally added to the reactants prior to or during the contacting of them with a carbonate precursor. Useful molecular weight regulators include, but are not limited to, monohydric phenols such as phenol, chroman-I, para-tertiary-butylphenol, and the like. Techniques for the control of molecular weight are well known in the art and may be used for controlling the molecular weight of the copolycarbonate-resins of the invention.

The catalysts employed, if an interfacial polymerization technique is used, accelerate the rate of polymerization of the dihydric phenol reactant with the carbonate precursor such as phosgene. Suitable catalysts include but are not limited to tertiary amines such as triethylamine, quaternary phosphonium compounds, quaternary ammonium compounds, and the like.

The preferred process for preparing polycarbonate—polyisobutylene copolymer resins of the invention comprises a phosgenation reaction. The temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition may be used to control the reaction temperature. The amount of the phosgene required will generally depend upon the amount of the dihydric phenol and the amount of dicarboxylic polymer acid present, and may be a stoichiometric proportion.

Representative of dihydric phenols which may be employed are those of the formula:

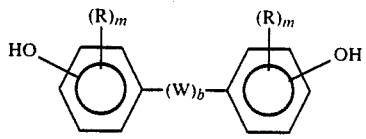 (VII)

wherein:

each R is independently selected from halogen, hydrocarbyl and monovalent hydrocarbonoxy radicals;

W is selected from divalent hydrocarbon radicals, —O—, —S—, —S—S—,

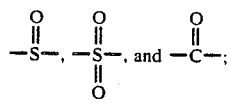

each m is independently selected from whole numbers having a value of from 0 to 4 inclusive; and b is either zero or one, preferably one.

Preferred halogen radicals represented by R are chlorine and bromine. The preferred monovalent hydrocarbyl radicals represented by R include alkyl, cycloalkyl, aryl, aralkyl, and alkaryl radicals.

The preferred alkyl radicals represented by R are those containing from 1 to about 10 carbon atoms. The preferred cycloalkyl radicals represented by R are those containing from 6 to 12 ring carbon atoms, i.e., phenyl, naphthyl, and biphenyl. The preferred aralkyl and alkaryl radicals represented by R are those containing from 7 to 14 carbon atoms, inclusive.

The monovalent hydrocarbonoxy radicals represented by R have the general formula —OR", wherein R" has the same meaning as R (but not halogen). Preferred hydrocarbonoxy radicals are the alkoxy and the aryloxy radicals.

The divalent hydrocarbon radicals represented by W include the alkylene radicals, alkylidene radicals, cycloalkylene radicals, and cycloalkylidene radicals. Preferred alkylene radicals are those containing from 2 to 20 carbon atoms. Preferred alkylidene radicals are those containing from 1 to 20 carbon atoms. Preferred cycloalkylene and cycloalkylidene radicals are those containing from 6 to 16 ring carbon atoms.

Some illustrative, non-limiting examples of the dihydric phenols represented by Formula VII include:
2,2-bis(4-hydroxyphenyl)propane; i.e., bisphenol-A;
2,2-bis(3,5-dimethyl-4-hydroxyphenyl)propane;
2,2-bis(3,5-dibromo-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)pentane;
bis(4-hydroxyphenyl)methane;
bis(3,5-diethyl-4-hydroxyphenyl)methane;
1,3-bis(4-hydroxyphenyl)propane;

4,4'-thiodiphenol; and
4,4'-dihydroxy-2,6-dimethyldiphenyl ether.

The dihydric phenols which may be used in the preparation of the copolymer resins of the invention are well known in the art and are described, inter alia, in U.S. Pat. Nos. 3,018,365; 2,999,835; 3,148,172; 3,271,368; 2,991,273; 3,271,367; 3,280,078; 3,041,891 and 2,999,846, all of which are incorporated herein by reference.

As a class, the most preferred dihydric phenols employed in the preparation of the polycarbonate moiety in the polycarbonate—polyisobutylene block copolymers of the invention are those that provide repeating or recurring chain units of the formula (V) given above, having the more specific formula:

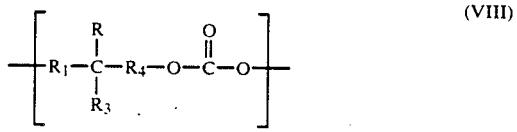

(VIII)

wherein $R_1$ and $R_4$ are each selected from a divalent aromatic hydrocarbon radical, a divalent, halogen-substituted aromatic hydrocarbon radical and a divalent, alkyl-substituted aromatic hydrocarbon radical; and $R_2$ and $R_3$ are each selected from the group consisting of hydrogen and hydrocarbyl.

As used throughout this specification and claims, the term "hydrocarbyl" is used to mean the monovalent moiety obtained upon removal of a hydrogen atom from a parent hydrocarbon. Representative of hydrocarbyl are alkyl of 1 to 25 carbon atoms, inclusive, such as methyl, ethyl, propyl, butyl, pentyl, hexyl, heptyl, octyl, nonyl, undecyl, decyl, dodecyl, octadecyl, nonodecyl, eicosyl, heneicosyl, docosyl, tricosyl, tetracosyl, pentacosyl and the isomeric forms thereof; aryl of 6 to 25 carbon atoms, inclusive, such as phenyl, tolyl, xylyl, napthyl, biphenyl, tetraphenyl and the like; aralkyl of 7 to 25 carbon atoms, inclusive, such as benzyl, phenethyl, phenpropyl, phenbutyl, phenhexyl, napthoctyl and the like; cycloalkyl of 3 to 8 carbon atoms, inclusive, such as cyclopropyl, cyclobutyl, cyclopentyl, cyclohexyl, cycloheptyl, cyclooctyl and the like; alkenyl of 2 to 25 carbon atoms, inclusive, such as vinyl, allyl, butenyl, pentenyl, hexenyl, octenyl, nonenyl, decenyl, undececyl, dodecenyl, tridecenyl, pentadeceyl, octadecenyl, pentacosynyl and isomeric forms thereof.

The terms "substituted hydrocarbyl", "substituted alkyl", "substituted aralkyl" and "substituted—hydrocarbon" radical as used herein mean the hydrocarbyl moiety as previously defined wherein one or more hydrogen atoms have been replaced with a specific chemical group as mentioned in conjunction with the defined term.

The carbonate precursors useful in the preparation of the polycarbonate—polyisobutylene copolymer resins of the instant invention include the carbonyl halides, the bishaloformates, and diaryl carbonates. The carbonyl halides include carbonyl chloride, carbonyl bromide, and mixtures thereof. The bishaloformates include the bishaloformates of dihydric phenols such as bisphenol-A, hydroquinone, and the like; and the bishaloformates of glycols such as ethylene glycol and neopentyl glycol. Typical of the diaryl carbonates are diphenyl carbonate and di(alkylphenyl) carbonates such as di(tolyl) carbonate. Some other illustrative examples of diarylcarbonates include di(naphthyl) carbonate, phenyl tolyl carbonate, and the like.

The preferred carbonate precursor is carbonyl chloride, also known as phosgene.

Also included herein are polycarbonate moieties which are randomly branched. These randomly branched polycarbonate moieties are obtained by adding a minor amount, typically between about 0.05 and 2.0 mole percent, based on the amount of dihydric phenol used, of a polyfunctional aromatic compound which functions as a branching agent. These polyfunctional aromatic compounds contain at least three functional groups which may be hydroxyl, carboxyl, carboxylic anhydride, haloformyl, and mixtures thereof. Some illustrative non-limiting examples of these compounds include trimellitic anhydride, trimellitic acid, trimellityl trichloride, 4-chloro formyl phthalic anhydride, pyromellitic dianhydride, mellitic acid, mellitic anhydride, trimesic acid, and the like. The method of incorporating branching in the polycarbonate units of the block copolymers of the invention are known to those skilled in the art; see for example the description in U.S. Pat. No. 4,001,184.

The relative proportion of chain units of the formula (V) and of the chain units of formula (VI) found in the polycarbonate—polyisobutylene block copolymer resins of the invention generally depend upon the amounts of compounds of Formulae (I) and (VII) used in the preparation of the copolymer. Thus, for example, if 10 weight percent of polymer (I) is used the resin will contain about 10 weight percent of structural unit (VI) in the polymer chain. Any relative proportion of the chain units of the formulae (V) and (VI) may be found in the copolymer resins of the invention. Preferably, from 0.5 to 50 weight percent of the polymer of formula (I) is used. At the higher proportion, the copolymer of the invention will exhibit increasing properties of elasticity as compared to copolymers made with lower proportions of the polymer of formula (I).

The polycarbonate—polyisobutylene block copolymers of the instant invention described above may have a weight average molecular weight of from about 20,000 to about 200,000, preferably from about 30,000 to about 150,000 and an intrinsic viscosity, as measured in methylene chloride at 25° C., of at least about 0.4 dl/gm, preferably from about 0.45 to about 1.40 dl/gm.

The polycarbonate—polyisobutylene block copolymers of the invention are useful as thermoplastic molding compositions. The moldable resins and resin compositions are useful to mold a wide variety of useful articles such as component parts of automobiles, tool housings and the like articles by conventional molding techniques including injection molding, solvent casting and the like procedures.

When employed as the active ingredient in a thermoplastic molding composition, the polycarbonate—polyisobutylene block copolymers of the instant invention may optionally have admixed therewith the commonly known and used processing or product additives such as, for example, antioxidants; antistatic agents; inert fillers such as glass, talc, mica, and clay; ultraviolet radiation absorbers such as the benzophenones, benzotriazoles, and cyanoacrylates; hydrolytic stabilizers such as the epoxides; color stabilizers such as the organophosphites; and flame retardents.

Some particularly useful flame retardants are the alkali and alkaline earth metal salts of organic sulfonic acids. These types of flame retardants are disclosed, inter alia, in U.S. Pat. Nos. 3,933,734; 3,948,851; 3,926,908; 3,919,167; 3,909,490; 3,953,396; 3,931,100; 3,978,024; 3,953,399; 3,917,559; 3,951,910 and 3,940,366, all of which are hereby incorporated herein by reference thereto.

COPOLYESTER-CARBONATE/POLYISOBUTYLENE RESINS

Block copolymers within the scope of the invention also include the polymerization reaction products of copolyester—carbonate monomer precursors with the polymer compounds of the formula (I) given above. Briefly stated the copolyester—carbonate chain units comprise recurring carbonate groups, carboxylate groups, and aromatic carboxylic groups in the linear polymer chain in which at least some of the carbonate groups and at least some of the carboxylate groups are bonded directly to the ring carbon atoms of the aromatic carbocyclic groups.

The copolyester—carbonate chain units contain ester bonds and carbonate bonds in the polymer chain unit wherein the amount of ester bonds is from about 25 to about 90 mole percent. For example, 5 moles of bisphenol-A reacting completely with 4 moles of isophthaloyl dichloride and one mole of phosgene would give a copolyester—carbonate chain unit of 80 mole percent ester bonds.

The copolyester-carbonate-polyisobutylene block copolymer resins of the instant invention may be derived from (i) at least one dihydric phenol of Formula (VII) given above, (ii) a carbonate precursor as previously described (iii) at least one ester precursor, and (iv) at least one dicarboxylic terminated polymer of Formulae (III) as described above.

The ester precursor is a difunctional carboxylic acid or an ester forming reactive derivative thereof. In general any difunctional carboxylic acid or its ester forming reactive derivative conventionally used in the preparation of linear polyesters may be used in the preparation of the instant copolyester-carbonate-polyisobutylene resins. Generally the difunctional carboxylic acids which may be used include the aliphatic carboxylic acids, the aliphatic-aromatic carboxylic acids, and the aromatic carboxylic acids. These acids are described in U.S. Pat. No. 3,169,121, which is hereby incorporated herein by reference. The preferred difunctional carboxylic acids and their ester forming reactive derivatives are the aromatic difunctional carboxylic acids and their ester forming reactive derivatives. Aromatic difunctional carboxylic acids suitable for producing poly(ester-carbonates) may be represented by the general formula:

$$HOOC-R^1-COOH \quad (IX)$$

wherein $R^1$ represents a divalent aromatic radical such as phenylene, naphthylene, biphenylene or substituted phenylene; two or more aromatic groups connected through non-aromatic linkages such as a cycloaliphatic group of five to seven carbon atoms, inclusive (e.g. cyclopentyl, cyclohexyl), or a cycloalkylidene of five to twelve carbon atoms, inclusive, such as cyclohexylidene; a sulfur-containing linkage, such as sulfide, sulfoxide or sulfone; an ether linkage; a carbonyl group; a tertiary nitrogen group; or a silicon-containing linkage such as silane or silocy; or a divalent aliphatic-aromatic hydrocarbon radical such as an aralkyl or alkaryl radical. For purposes of the present invention, the aromatic dicarboxylic acids or their reactive derivatives such as, for example, the acid halides or diphenyl esters, are preferred. Thus, in the preferred aromatic difunctional carboxylic acids, as represented by Formula (IX), $R^1$ is an aromatic radical such as phenylene, biphenylene, naphthylene or substituted phenylene. Some nonlimiting examples of suitable aromatic dicarboxylic acids which may be used in preparing the poly(ester-carbonate)polyisobutylenes of the instant invention include phthalic acid, isophthalic acid, terephthalic acid, homophthalic acid, o—, m—, and p-phenylenediacetic acid, and the polynuclear aromatic acids such as diphenyl dicarboxylic acids, and isomeric napthalene dicarboxylic acids. The aromatic dicarboxylic acid may be substituted with an inorganic atom such as halogen; an organic group such as the nitro group, an organic group such as R above; or an alkoxy group; it being only necessary that the substituent group be inert to and unaffected by the reactants and the reaction conditions. Of course, these acids may be used individually or as mixtures of two or more different acids.

Particularly useful difunctional carboxylic acids are isophthalic acid, terephthalic acid, and mixtures thereof.

Instead of using the difunctional carboxylic acids as the ester precursor it is at times preferred to utilize their ester forming reactive derivatives. Thus, for example, instead of using isophthalic acid, terephthalic acid, or mixtures thereof it may be preferred to use isophthaloyl dichloride, terephthaloyl dichloride, or mixtures thereof.

The copolyester-carbonate/polyisobutylene resins of the instant invention may be prepared by well known conventional methods. These methods include transesterification, melt polymerization, interfacial polymerization, and the pyridine process. Various of these methods are described in U.S. Pat. Nos. 3,169,121, 3,030,331, 3,207,814 and 4,188,314, all of which are incorporated herein by reference.

Particularly useful processes for the preparation of the copolyester-carbonate-polyisobutylene resins, is the interfacial polymerization process generally described above in relation to the preparation of the polycarbonate—polyisobutylene block copolymers of the invention.

It will be appreciated therefore by those skilled in the art that the copolyester-carbonate-polyisobutylene copolymers of the instant invention prepared by the interfacial polymerization process utilizing as the reactants (i) at least one dihydric phenol of Formula VII, (ii) a carbonate precursor, (iii) at least one ester precursor, and (iv) one polymer of Formula I; contain recurring structural units of the formula (VI) and of the formula:

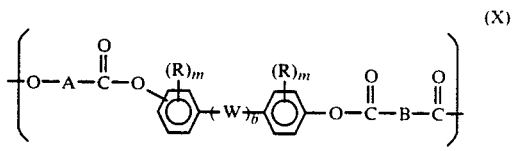

wherein R, W, m, and b are as defined above; A and B each represent the divalent organic moiety of the ester precursor between the two functional groups of the ester precursor.

The relative proportions of structural units VI and X present in the copolyester-carbonate-polyisobutylene resin will depend upon the amounts of polymer of Formulae (I) used in the prepration of the copolyester-carbonate-polyisobutylene resin, as described above in relation to the polycarbonate-polyisobutylene copolymers of the invention described above.

For example, if 10 weight percent of the polymer (I) is used in the preparation of the copolyester-carbonate-polyisobutylene resin, and assuming complete reaction, the product resin will contain 10 weight percent (total) of units of formula (VI). Although any proportion of the polymer (I) may be used to prepare the block copolymers of the invention, it is preferred that the proportion be within the range of from 5 to 50 weight percent.

The copolyester-carbonate-polyisobutylene copolymers of this invention may optionally have admixed therewith the aforedescribed additives to make molding compositions.

The instant coployester-carbonate-polyisobutylenes generally have a weight average molecular weight of from about 20,000 to about 200,000, preferably from about 25,000 to about 150,000; and an intrinsic viscosity, as measured in methylene chloride at 25° C., of at least about 0.4 dl/gm, preferably from about 0.45 to about 1.40 dl/gm. They are useful to mold a variety of thermoplastic articles such as automobile parts, valves and the like.

POLYAMIDE-POLYISOBUTYLENE BLOCK COPOLYMERS

The carboxy-terminated, acyl halide terminated and ester terminated polymers of the formula (I) given above may be polymerized with polyamines under conventional amidization conditions to obtain block copolymers which are useful as adhesives, binder resins for flexographic ink compositions and as curing agents for epoxy resins. Preferred block copolymers are obtained by the condensation of a diacid component with a substantially equivalent proportion of an organic diamine. The diacid component may comprise the dicarboxylic polymer acid of the formula (III) but preferably includes as co-acids a dicarboxylic acid of the formula:

$$HOOC-R_5-COOH \qquad (XI)$$

wherein $R_5$ represents alkylene of 1 to 20 carbon atoms, inclusive, and optionally in addition a monocarboxylic acid of the formula:

$$R_6-COOH \qquad (XII)$$

wherein $R_6$ is selected from the group consisting of alkyl having 1 to 20 carbon atoms, inclusive, phenyl and hydroxy-substituted phenyl. The ratio of the moles of acid of formula (III) to the acid of formula (XI) in the diacids mixture may be in the range of from 1-2 to 1 and the ratio of the sum of the moles of acids of formulae (III) and (XI) to the moles of acid of formula (XII) being from 1 to 0.0-0.08 as an example.

The term "alkylene of 1 to 20 carbon atoms" is used throughout the specification and claims to mean the divalent moiety obtained upon removal of two hydrogen atoms from a hydrocarbon having the stated carbon content. Representative of alkylene of 1 to 20 carbon atoms are methylene, ethylene, propylene, butylene, pentylene, hexylene, heptylene, octylene and isomeric forms thereof.

The method of preparing the polyamide-polyisobutylene copolymers is a conventional polyamide preparation, several of which are well known. Polymerization reacts an amine group and a carboxylic acid group to form an amide group with the concomitant elimination of water; see for example U.S. Pat. No. 3,377,303. Other processes include solution or interfacial polymerization. These processes are recommended to react an amine and an acid chloride to form a polyamide with the loss of acid. A preferred process is melt polymerization, by amine-ester interchange. A solvent may be added, or the process may be performed without a solvent as described in U.S. Pat. No. 4,567,249, hereby incorporated by reference.

The dicarboxylic acids of formula (XI) are well known and include aliphatic, cycloaliphatic and aromatic dicarbocylic acids. Representative of such acids, which may contain from 3 to 20 carbon atoms, are oxalic, glutaric, malonic, adipic, succinic, suberic, azelaic, sebacic, dodecanedioic and pimelic acids. Methods of preparing these acids are well known and they are available commercially.

Preferred dicarboxylic acids of formula (XI) employed in the present invention are straight chain aliphatic diacids having at least 6 carbon atoms and more preferably 6 to 16 carbon atoms, such as azelaic and sebacic acids, which are most preferred. It should be understood that use of the corresponding acid anhydrides, esters and acid chlorides of these acids is included in the term "dicarboxylic acid".

The monocarboxylic acids of the formula (XII) described above are also generally well known as is their prepration. Representative of the acids of formula (XII) are acetic, propionic, butyric, n-valeric, neopentanoic, heptanoic, 3-ethylhexanoic, pelargonic, decanoic, undecanoic, dineopentylacetic, tridecanoic, myristic, pentadecanoic, hexadecanoic, heptadecanoic, palmitic, stearic, oleic, arachidic, behenic, benzoic, salicylic and like acids. The softening points of the adhesive polyamide-polyisobutylene copolymers of the invention are not greatly affected by the selection of any particular monocarbocylic acid of the formula (XII). However, use of the lower molecular weight aliphatic acids such as acetic, neopentanoic and pelargonic acids generally results in copolymers of the invention characterized by the highest melt viscosity and higher tensile strengths than are obtainable when the monocarboxylic acid (XII) is of a higher molecular weight.

The organic polyamines preferably employed in preparing the copolymers of the present invention may be one or more of the known linear aliphatic, cycloaliphatic or aromatic diamines having from about 2 to 20 carbon atoms. Preferred especially are the alkylene diamines. Illustrative of the preferred diamines are ethylene diamine (EDA), 1,3-diaminopropane, 1,4-diaminobutane, 1,6-hexamethylene diamine (HMDA), 4,4'-methylene-bis-(cyclohexylamine) (PACM), 1,20-diamino eicosane, isophorone diamine, cyclohexanebis-(methylamines), bis 1,4-(2 aminoethyl)-benzene, piperazine (PIP) 1,3-di-(4-piperidyl-propane (DIPIP) and 1-(2-aminoethyl) piperazine. Also preferred are the polyglycol diamines such as Jeffamine ® D-2000 available from Texaco and polyglycol diamine H-221 available from Union Carbide Corporation. Most preferred are the primary diamines EDA and PACM, alone or in combination with the secondary diamines PIP and DIPIP. These diamine compounds are all prepared by well known methods and many are commercially available.

Polyamide-polyisobutylene block copolymers useful as hot melt adhesives may be prepared by mixing, heating and reacting the mixture of acids of formulae (I), (XI) and (XII) with a substantially equivalent proportion of polyamine, to produce a neutral or balanced polyamide, i.e., the acid and amine numbers are substantially equal. By "substantially equivalent proportion" it is meant that the total number of amine groups provided in the reaction mixture should approximate the total number of acid groups presented by the mixtures of acids. In practice this is accomplished by providing a slight excess (circa 2 percent) of the polyamine in the initial reaction mixture to compensate for the small proportion usually lost through volatization under the conditions of the amidization reaction. The temperature at which this condensation polymerization is carried out is not critical, but is advantageously carried out at a temperature of from about 100° C. to about 300° C., preferably within the range of from about 180° C. to 300° C. To assist the polymerization, a polymerization catalyst may be added to the reaction mixture in a catalytic proportion. Representative of such catalysts is phosphoric acid.

The term "catalytic proportion" is used herein in the usual sense as meaning that proportion which will catalyse the desired polymerization. In general such a proportion is within the range of from about 0.001 to 3 weight percent, most preferably 0.01 to 1.0 percent by weight of the total charge of reactants.

In addition, it is understood that small amounts of surface active materials may be added to the poymerization to reduce foaming. Representative of such materials are Dow Corning's DB-100, silicone anti-foam.

It is advantageous to also include as a componenet of the polymerization reaction mixture, an antioxidant. Any of the well known antioxidants may be employed in conventional proportions, i.e., from 0.1 to about 2 percent by weight of the reactants.

In order to avoid undue discoloration of the copolymer product, the method of preparation is preferably carried out in an inert atmosphere such as is provided by carbon dioxide, nitrogen or argon gases. During the course of the reaction, amidization occurs with formation of water. The formed water is advantageously allowed to distill out of the reaction mixture as the condensation polymerization occurs. Distillation may be assisted by allowing a slow stream of inert gas such as nitrogen to be bubbled through or over the reaction mixture. Although not necessary, an inert organic solvent such as xylene may be added to the reaction mixture in small proportions to assist removal of water by azeotropic distillation. Generally such proportion should not exceed about 10 percent by weight of the reaction mixture. The heating of the reaction mixture may be carried out until a selected viscosity of the reaction mixture is reached, e.g. 1,500 cps/195° C.-60,000 cps/260° C. and preferabbly 2,000 cps/195° C.-30,000 cps/246° C. In addition, small amounts (0.5 to 10 eq. %) of a saturated linear monobasic carboxylic acid containing 5-20 carbons such as for example stearic and palmitic acid, or other reactive monomers such as phenyl benzoate or triphenylphosphite may be added to the mixture to control molecular weight and viscosity.

The preparation may be carried out at atmospheric or slightly higher pressures. However, toward the end of the polymerization step it is advantageous to opeate under a slight vacuum. This aids in removal of by-products, solvent and condensation water, unreacted diamine and in driving the polymerization to completion. Completion of the polymerization may also be observed when aliquots of the reaction mixture, taken periodically, indicate by analysis that the acid and amine numbers for the reaction mixture are each less than about 50, preferably less than 10. Generally polymerization is complete within about 1 to 7 hours, depending on the specific nature of the acid reactants. Any conventional and convenient reaction vessel may be used to condense the reactants and carry out the polymerization.

The preferred polyamide-polyisobutylene copolymers of the invention may be characterized, in general, as having a number average molecular weight ranging from about 12,000 to about 60,000 g/mole, preferably from about 15,000 to about 40,000 g/mole, and most preferably from about 20,000 to about 35,000 g/m, as determined by membrane osmometry; J. Herold, G. Meyerhoff, Evr. Polym. J. 15,525 (1979). Alternately, preferred copolymers may be described as having an intrinsic viscosity ranging from about 0.5 to about 1.6 dl/g, preferably from about 0.9 to about 1.2 dl/g as measured with 40 mg. per 10 cc of a 60/40 weight ratio phenol/tetrachloroethylene solvent at 30° C. The copolymers of the higher molecular weights are generally most useful as hot-melt adhesives and epoxy curatives while the lower molecular weight copolymers find a greater utility as binder components of flexographic ink compositions.

POLY(ESTER-AMIDE)-POLYISOBUTYLENE BLOCK COPOLYMERS

Copolymers of polyisobutylene and poly(ester-amides) having useful adhesive properties may be prepared by condensation of substantially equivalent proportions of a mixture of the polymeric dicarboxylic acids of the formula (III) given above and monomeric dicarboxylic acids with a mixture of organic diamines and diols. Preferred copolymers of the invention comprise the product of the polymerization of
 (a) from 10 to 60 equivalent percent of the polymeric compound of formula (I) wherein X represents a hydroxyl group;
 (b) from 40 to 90 equivalent percent of a linear dicarboxylic acid; with a substantially equivalent amount of
 (c) from 40 to 90 equivalent percent of an organic diamine; and
 (d) from 40 to 60 equivalent percent of a diol.

The reactants employed to prepare the poly(ester-amide)-polyisobutylene copolymers of the invention are all well known as are the methods of their preparation, or have been described above.

A wide variety of linear dicarboxylic acids may be employed in the preparation of the copolymers of the invention. These include the dicarboxylic acids of formula XI given above. Preferred for the preparation of the poly(ester-amide)-polyisobutylene copolymers are straight chain aliphatic diacids having at least 6 carbon atoms and more preferably 6 to 12 carbon atoms, such as azelaic and sebacic acids, which are most preferred. It should be understood that use of the corresponding acid anhydrides, esters, and acid chlorides of these acids is included in the term "dicarboxylic acid".

The organic diamines preferably employed in preparing the poly(ester-amide)-polyisobutylene copolymers may be one or more of the known linear aliphatic, cycloaliphatic or aromatic diamines having from about 2 to 20 carbon atoms. Preferred especially are the alkylene diamines. Illustrative of the preferred diamines are ethylene diamine, 1,3-diaminopropane, 1,4-diaminobutane, 1,6-hexamethylene diamine (HMDA), 4,4'-methylene-bis-(cyclohexylamine) 2,2-bis(4-aminocyclohexyl) (4',4'-cyclohexylamine)propane, isophorone diamine, cyclohexanebis(methylamines), and bis-1,4-(2'aminoethyl)-benzene. Also preferred are the polyglycol diamines such as Jeffamine ® D-2000 available from Texaco. These diamine compounds are all prepared by well known methods and many are commercially available.

Diols employed in the invention described above are also generally well known compounds as are the methods of their preparation. Representative of preferred diols are straight chain aliphatic diols such as ethylene glycol, 1,3-propylene glycol, 1,4-butylene glycol, 1,6-hexamethylene glycol and the like. Particularly preferred as the diol component of the poly(ester-amide)-polyisobutylene copolymers of the invention are cyclic diols such as 1,4-bis(hydroxymethyl)cyclohexane, also known as 1,4-cyclohexanedimethanol and the like.

The techniques and general method of polymerizing the mixed reactants is generally well known; see for example U.S. Pat. Nos. 3,377,303 and 4,343,743. In general, the poly(ester-amides)-polyisobutylene copolymers of the present invention may be prepared by charging a resin kettle with the reactants, in proportions as hereinabove described and heating the mixture to a temperature at which polymerization occurs. In general, the reactants are heated to a temperature of from about 130° to 160° C. to initiate polymerization, and thereafter at a temperature sufficient to distill off the water of condensation. Preferably, the heating is carried out under an inert gas atmosphere such as under a blanket of nitrogen gas. To assist the polymerization, a polymerization catalyst may be added in a catalytic proportion. Representative of such catalysts are phosphoric acid and tin oxalate. The heating of the reaction mixture may be carried out until a selected viscosity of the reaction mixture is reached, e.g. 1,000-100,000 cps at 195° C. and preferably 7,500-20,000 cps at 195° C. In addition, small amounts (0.5 to 10 eq. %) of a saturated linear carboxylic acid containing 5-20 carbons such as for example stearic and palmitic acid, or other reactive monomers such as phenyl benzoate or triphenylphosphite may be added to the mixture to control molecular weight and viscosity.

The relative quantities of the reactants are selected so that substantially equivalent numbers of reactive carboxyl and amine groups are present in the reaction mixture to produce a neutral or balanced poly(ester-amide)-polyisobutylene i.e., the acid and amine numbers are substantially equal. Slight excesses of carboxyl or amine are acceptable but this ratio is preferably maintained between 0.9:1 and 1:1.1 so that acid and amine numbers will be less than 35, and preferably less than 20. Amine and acid numbers may be measured by conventional titrametric analytical techniques.

POLYESTER-POLYISOBUTYLENE BLOCK COPOLYMERS

Polyester-polyisobutylene block copolymers of the invention may be prepared by the polycondensation reaction of the dicarboxylic acid polymer of the formula (III) given above with a substantially equivalent proportion of a diol. Representative of diols which are preferably employed in the polycondensation are those described above in relation to the preparation of the poly(ester-amide)-polyisobutylene block copolyners of the invention. The polycondensation reaction conditions are well known to those skilled in the art and comprise heating the reactant to a temperature within the range of from about 150° C. to 280° C. with removal of water of condensation. An esterification catalyst may be present in the reaction mixture although not necessary (since the reaction is self-catalysed by the carboxyl groups of the diacid component). The direct esterification polymerization is well known as are alternate and optimal conditions for carrying out the reaction; see for example the Kirk-Othmer Encyclopeida of Chemical Technology, Interscience Publishers, Vol. 16, pages 162–165.

A preferred method of preparing the polyester-polyisobutylene block capolymers of the invention is by the ester-exchange method which is also a well known polyesterification technique. The ester-exchange method may be carried out by reaction of the carbomethoxy-terminated polyisobutylene polymer of formula (I) given above, with the diols described above. Alternatively, a diester of the diol may be employed in a transesterification polymerization. Generally, the ester-exchange polymerization is carried out in the presence of a basic catalyst. Basic type catalysts usually employed in transesterification reactions, include for example, oxides, hydrides, hydroxides or amides of the alkali or alkaline earth metals as well as basic metal oxides such as zinc oxides, salts of weak acids such as lithium stearate and organotitanium, organoaluminums and organotins such as tetraoctyltitanate. The reaction conditions are well known; see for example Kirk-Othmer, supra., at pages 165–168 and U.S. Pat. No. 3,533,994.

The polyester-polyisobutylene block copolymers of the invention are useful for a wide range of purposes, depending to some extent upon the nature of the diol reactant employed in their preparation. In general, the polyester-polyisobutylene copolymer resins are most useful as thermoplastic elastomers when molded into gaskets, washers, flexible tubing and like articles.

Prefered polyester-polyisobutylene copolymers of the invention may be characterized in part by an intrinsic viscosity within the range of from 0.5 to 2.0 dl/g (measured in a solution of 40 percent by weight of tetrachloroethane/60 percent by weight of phenol) at a temperature of from 25° C. to 30° C.

POLYARYLATE-POLYISOBUTYLENE BLOCK COPOLYMERS

Polyarylates are generally linear aromatic polymers containing repeating aromatic ester structural units in the polymer chain. These polyarylates are derived from the reaction of dihydric phenols and aromatic dicarboxylic acids or their reactive derivatives, for example the acylhalide derivatives. The polyarylates are generally useful as molding resins for the molding of structural engineering articles such as wall panels, architectural devices such as moldings, window frames and like articles. However, many of the polyarylates exhibit relatively low impact resistance properties and flexibility.

The polyarylate-polyisobutylene block copolymers of the present invention are an improvement over prior art polyarylate resins in that they exhibit a higher degree of elasticity, impact resistance and flexibility. The polyarylate-polyisobuetylene copolymers of the invention may be prepared by the known processes for preparing polyarylate polymers, modified by replacing a portion of the previously used aromatic dicarboxylic acids with an equivalent proportion of the dicarboxy-terminated polymers of formula (I) given above or the acyl halide derivative of formula (I). Thus, the new polyarylate-polyisobutylene copolymers of the invention may be prepared by polymerization of substantially equimolar proportions of (i) a mixture of at least one aromatic dicarboxylic acid of the formula (IX) given above or the reactive derivative thereof and a dicarboxy polymer of formula (III) or the acyl halide thereof of formula (I) and (ii) a dihydric phenol of the formula (VII) given above. The mixture of diacids may comprise any proportions of the component dicarboxylic acids, i.e.; from 1 to 99 weight percent of the acid of formula (IX) to from 1 to 99 weight percent of the dicarboxylic acid of formula (III) or the reactive derivatives thereof.

In the preparation of the polyarylate-polyisobutylene copolymers of the invention only one particular aromatic dicarboxylic acid may be used, or a mixture of two or more different aromatic dicarboxylic acids of the formula (IX) may be employed.

The preparation of the polyarylate-polyisobutylene copolymers of the invention may be accomplished by known methods such as, for example, heterogeneous interfacial polymerization, solution condensation polymerization, and melt condensation polymerization. A convenient method is the heterogeneous interfacial polymerization technique. In accordance with the usual heterogeneous interfacial polymerization procedure the reactants are present in different liquid phases which are immiscible and which, in the preparation of the polymers of the invention constitute two solvent media. Thus, the dihydric phenol is dissolved in one solvent medium, the polymer (III) and the aromatic dicarboxylic acid or their reactive derivatives are dissolved in a second solvent medium immiscible with the first, and the solutions are combined. Normally, an alkaline aqueous medium serves as the solvent for the dihdyric phenol and an organic solvent is utilized for the acid or its reactive derivative, said organic solvent being so chosen that it either dissolves the product produced or serves as a swelling medium therefor. Also present during the reaction are catalysts and chain terminators or molecular weight regulators.

The cataylsts which may be employed may be any of the well known catalysts which aid the interfacial polymerization reaction. Suitable catalysts include, but are not limited to, tertiary amines such as triethylamine, quaternary ammonium compounds, and quaternary phosphonium compounds.

The molecular weight regulators employed may be any of the well known compounds that regulate the molecular weight of polyarylates by a chain terminating mechanism. These compounds include, but are not limited to, phenol, tertiarybutyl phenol, and chroman-I.

The temperature at which the polymerization reaction proceeds may vary from below 0° C. to above 100° C. The polymerization reaction proceeds satisfactorily at temperatures from room temperature (25° C.) to about 50° C.

The polyarylate-polyisobutylene block copolymers of the invention generally have a weight average molecular weight in the range of from about 5,000 to about 200,000, preferably from about 10,000 to about 100,000.

It will be appreciated that the polyarylate-polyisobutylene block copolymers of the invention will contain at least one recurring structural unit of the formula (VI) given above and at least one recurring structural unit of the formula:

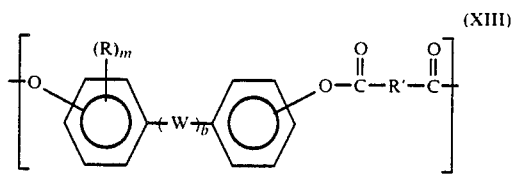

wherein R, W, R', m and b are as previously defined.

The relative proportions of the structural units of the formulae (VI) and (XIII) will of course depend on the relative proportions of the aromatic dicarboxylic acids (IX) and the polymeric dicarboxylic acid of the formula (III) or their reactive derivatives employed.

The polyarylate-polyisobutylene copolymers of the invention are useful molding resins and may be compounded for thermoplastic molding by admixture in conventional proportions with the commonly known and used additives such as inert fillers such as clay, mica, talc and glass fibers; antioxidants; hydrolytic stabilizers; color stabilizers and the like.

POLY(ETHERIMIDE)-POLYISOBUTYLENE COPOLYMERS

A novel class of poly(etherimide)-polyisobutylene copolymer thermoplastic elastomers may be prepared by reacting substantially equivalent proportions of the diacyl halide polymers of the formula (I) given above with a hydroxy-terminated poly(etherimide) such as that disclosed in the U.S. Pat. No. 4,611,048 (incorporated herein by reference thereto). The block copolymerization may be carried out by bringing the reactants together in the presence of an inert organic solvent for the reactants and the product copolymer and in the presence of an acid acceptor such as an amine base, preferably triethylamine and in the presence of the hydroxide of an alkali or alkaline earth metal catalyst.

The role of an inert organic solvent as previously defined may be filled by halogenated hydrocarbons such as methylene chloride, chloroform and carbon tetrachloride. The reaction proceeds conveniently at about room temperature (circa 20° to 30° C.) but may be speeded by warming the reaction mixture. Sub-, super- or atmospheric pressures may be employed during the reaction.

Upon cessation of the reaction as may be determined by infra-red analyses to observe the disappearance of OH bonds, the desired copolymer may be separated from the reaction mixture by conventional techniques such as by precipitation in methanol, filtration and washing.

The following examples and preparations describe the manner and process of making and using the invention and set forth the best mode contemplated by the inventor of carrying out the invention but are not to be construed as limiting the invention. Where reported, the following tests were carried out.

Glass Transition Temperature (Tg)

The glass transition temperatures were determined by using a Perkin-Elmer DSC-2B instrument which measures the glass transition temperature by differential scanning calorimetry.

Intrinsic Viscosity (I.V.)

The intrinsic viscosity was measured at a temperature of 25° C. in the indicated solvent and is reported in deciliters/gram (dl/g).

Melt Flow:

ASTM TEST METHOD D-1238

The Kasha Index (KI) of a resin is an indication or measure of the processability of the resin. The lower the KI the greater the melt flow rate and, therefore, the better the processability of the resin. Basically, the KI is a measurement of the melt viscosity of the resin. The procedure for determining the Kasha Index is as follows: 7 grams of resin pellets, dried a minimum of 90 minutes at 125° C., are added to a modified Tinius-Olsen model T-3 melt indexer; the temperature in the indexer is maintained at 300° C. and the resin is heated at this temperature for 6 minutes; after 6 minutes the resin is forced through a 0.04125 inch radius orifice using a plunger of radius of 0.1865 inch and an applied force of 17.7 pounds; the time required for the plunger to travel 2 inches is measured in centiseconds and this is reported as the KI. The higher the KI the greater the melt miscosity and the more viscous the resin, and the more difficult it is to process. The lower the KI the better the processibility of the resin.

Number Average Molecular Weight (Mn):

The Mn was determined by gel permeation chromatography.

Tensile Strength, Modulus and Elongation:
According to the ASTM test method D-638.
Flexural Properties:
According to ASTM test method D-790.
Notched Izod Impact Strength (NI):
According to ASTM test method D-256.
Heat Deflection Temperature:
According to ASTM test method D-648.

CARBOXY-TERMINATED POLYISOBUTYLENE

Example 1

A 3-liter flask equipped with a mechanical stirrer and a condensor is charged with 700 g. of butyl rubber (Exxon 365; Exxon Chemicals Co.; molecular weight viscosity average $\times 10^{-3} = 350$; 4.5 mole percent unsaturation) dissolved in 1250 ml. of n-octane. The charge is heated to a temperature of 70° C. and 150 ml. of concentrated (70%) nitric acid is added dropwise with stirring. After about 2 hours, the temperature of the resulting reaction mixture is increased to 90° C. After 8 hours at the higher temperature the reaction mixture is allowed to cool to room temperature. The cooled mixture is washed with water until neutral. Methanol is added to the washed mixture to precipitate carboxy-terminated polyisobutylene. The precipitate is separated by decantation and dried in a vacuum oven at a temperature of 125° C. to obtain 650 g. of the polymer product. The physical properties of the product in comparison to the starting butyl rubber are given in the Table 1, below. Infra-red analysis confirms the dicarboxy terminated polymer structure of the formula (III) given above.

TABLE 1

|  | Butyl Rubber | Polymer Product |
| --- | --- | --- |
| Mn | 70,000 | 11,500 |
| Iodine No. | 10.2 g/100 g. | 0.5 g/100 g. |
| I.V. (dl/g.) | 1.3 | 0.25 |

CARBOXY-TERMINATED POLYISOBUTYLENE

Example 2

A 22-liter flask fitted with a mechanical stirrer and a condenser is charged with 4 kg of butyl rubber (Exxon Chemicals, supra.; B-365X; molecular weight viscosity average $\times 10^{-3} = 350$; mole % unsaturation = 2.0) dissolved in 10 liters of n-octane with gentle warming. The charge is then heated to a temperature of 70° C. and 600 ml. of concentrated (70%) nitric acid is added dropwise with stirring. After about 2 hours the temperature of the reaction mixture is raised to 100° C. for 2 hours and then the mixture is allowed to cool to room temperature. The cool mixture is then washed with water until neutral. Methanol is added to precipitate carboxy terminated polyisobutylene polymer. The precipitate is separated by filtration and the filtrate evaporated to recover additional product. The polymer is dried in a vacuum oven at a temperature of 125° C. to obtain a combined product weight of 3300 gms. Product analysis (compared to the starting butyl rubber) is shown in Table 2, below.

TABLE 2

|  | Butyl Rubber | Polymer Product |
| --- | --- | --- |
| Mn (by GPC analysis) | 48,800 | 5800 |
| Iodine No. | — | 0.1 g/100 g. |

ACYL CHLORIDE-TERMINATED POLYISOBUTYLENE

Example 3

A 5 liter, 3-necked flask fitted with a paddle stirrer, nitrogen inlet, thermometer and an ice/water condenser is charged with 1000 g. (0.17 moles) of the carboxy-terminated polymer prepared in example 2, supra., and 2000 ml. of n-octane. The flask is purged with nitrogen gas and stirred to dissolve the polymer. To the resulting solution there is added with stirring 70 g. (0.59 moles) of thionyl chloride and 1.5 g (0.02 moles) of N,N-dimethylformamide. The resulting mixture is heated to a temperature of 60° C. for 1 hour then 80° C. for 4 hours and then 100° C. for one hour. At the end of this last time the reaction mixture is distilled to strip off n-octane and then excess thionyl choride under vacuum, to obtain 949 gms of the polymeric diacyl chloride. The polymer is shown to have an active chloride content of 1.2 percent by weight. The polymer structure is confirmed by Fourier Transform Infra-Red Spectroscopy.

CARBOMETHOXY-TERMINATED POLYISOBUTYLENE

Example 4

A 2 liter, 3-necked flask fitted with a mechanical stirrer, nitrogen inlet and a condenser is charged with 300 g. (0.052 moles) of the diacyl chloride prepared in Example 3, supra., 600 ml. n-octane and 200 ml. of 25 percent sodium methoxide in methanol (0.87 moles of sodium methoxide). The flask is purged with nitrogen gas and the charge warmed to a temperature of 60° C. for 6 hours. At the end of this time, the reaction mixture is allowed to cool to room temperature and washed first with 600 ml. of 5 percent hydrochloric acid and then with water until neutral. The 260 gms of carbomethoxy-terminated polyisobutylene product is separated by coagulation in methanol and drying under vacuum at a temperature of 125° C. The polymer structure is confirmed by Fourier Transform Infra-Red Spectroscopy.

PREPARATION OF POLYCARBONATE-POLYISOBUTYLENE BLOCK COPOLYMERS

Example 5

A 100 ml four neck flask is fitted with a mechanical stirrer, a pH probe, an aqueous caustic inlet tube and a Claisen adapter to which there is attached a dry ice condenser and a gas inlet tube. The flask is charged with 450 ml of water, 600 ml of methylene chloride, 1.0 ml of triethylamine, 2.0 gm (0.0133 moles; 3.3 molar percent of p-tertiary-butylphenol), 5.0 gm (0.0005 moles) of the polymer prepared in accordance with Example 1, supra. and 91.3 gm (0.40 moles) of bisphenol-A. With stirring, phosgene is introduced into the flask at a rate of 1 g/min. for 50 minutes with the pH maintained in a range of 10.5 to 11.5 by addition of 50% aqueous sodium hydroxide. The resin layer is then separated from the brine layer, washed with 3 wt. percent aqueous HCl until washing remains acidic, then twice with distilled water. The resin is then precipitated into methanol in a Waring blender and washed with methanol. The dried resin so obtained is characterized by an intrinsic viscosity of 0.49 dl/g, a Tg of 148° C., a melt flow of 64 g./10 min., a K.I. of 500 and an I.V. strand of 0.43 dl/g. The resin is useful as a molding resin to prepare exterior components of automobiles.

Example 6

The procedure of Example 5, supra., is repeated except that the proportion of p-tertiary-butylphenol is increased from 2.0 gms. to 2.15 gms (0.014 moles; 3.6 molar percent) to obtain a polycarbonate-polyisobutylene resin having an I.V. of 0.51 dl/g, a Tg of 149° C., an I.V. strand of 0.47 dl/g, a melt flow of 33.3 g/10 min. and a K.I. of 960. This resin is useful to thermoplastically mold thin-walled parts (by injection molding) and laser/video discs.

Example 7

This Example is not an Example of the invention but is made for purposes of comparison.

The procedure of Example 6, supra., is repeated except that the charge does not include any of the polymer prepared in accordance with Example 1, supra. The resin obtained is characterized by an I.V. strand of 0.47, a melt flow of 14.3 g/10 min. and a K.I. of 2230.

Example 8

A 1000 ml four neck flask is fitted with a mechanical stirrer, a pH probe, an aqueous caustic inlet tube and a Claisen adapter to which there is attached a dry ice condenser and a gas inlet tube. To the flask there is added 450 ml of water, 500 ml of methylene chloride, 1.0 ml of triethylamine, 75 g. (0.329 mole) of bisphenol-A is introduced into the flask at a rate of 1 g/min. for 36 minutes with the pH maintained at 11.0 by addition of 50% aqueous sodium hydroxide. The resin layer is then washed and the resin isolated as in Example 5, supra. The resin so obtained is flexible, characterized in part by an I.V. of 1.42 dl/g and a Tg of 146° C. and −69° C. The resin is useful to mold elastic thermoplastic articles.

Example 9

The procedure of Example 8, supra., is repeated except that the proportion of bisphenol-A is reduced to 65 gm (0.22 moles), the proportion of triethylamine is reduced to 0.5 ml, the proportion of water is reduced to 400 ml., the proportion of methylene dichloride is increased to 600 ml. and the phosgene is introduced at a rate of 0.75 gm/minute while maintaining the pH at a value within the range of 10.5 to 11.7. The resin obtained is charactered in part by an I.V. of 1.23 dl/g and a Tg of 173° C. and −70° C. The resin is a clear elastomer with a yield elongation of about 50%. The resin is useful to mold gaskets.

Example 10

The procedure of Example 9, supra., is repeated except that the proportion of bisphenol-A employed is reduced to 60 gm (0.263 moles) and the proportion of methylene chloride is reduced to 550 ml. Phosgene is introduced at a rate of 0.75 gm/min. for 33 minutes. The resin obtained is characterized in part by an I.V. of 0.98 dl/g, a Tg of 140° C. and −70° C. and a yield elongation of 90%. When a representative sample is solution cast, the film exhibits a water vapor transmission rate at 100 percent room humidity (ASTM Test method E96) of 3.0 g mil/100 square inches/day and an oxygen transmission rate at 50–75 percent room humidity (ASTM test method D3985) of 190 cc mil/100 square inches/day. The resin is useful to extrude films of gas barrier materials.

EXAMPLE 11

A 1000 ml. four-necked flask fitted with a mechanical stirrer, a pH probe, an aqueous caustic inlet and a Claisen adapter to which there is attached a dry ice condenser and a gas inlet tube, is charged with 30 gms. (0.131 moles) of bisphenol-A, 45 gms (0.083 moles) of tetrabromo-bisphenol-A, 40 gms (0.007 moles) of the dicarboxylic acid polymer prepared in accordance with Example 1, supra., 0.65 gms (0.004 moles) of p-tertiary-butylphenol, 3 ml. of triethylamine, 500 ml. of methylene chloride and 400 ml. of water. With stirring, phosgene is introduced at a rate of 1 gm/minute for 5 minutes at an initial pH of from 8.0 to 9.0. Then, phosgenation is continued for an additional 21 minutes while maintaining the pH within the range of 10.5 to 11.5 by addition of 50 percent aqueous sodium hydroxide. The resin layer is then separated from the brine layer, washed with 3 weight percent aqueous hydrochloric acid until the washing remains acidic, then twice with distilled water. The resin, precipitated into methanol is characterized by an I.V. of 0.77 dl/g and a bromine content of 21.9 percent. When compression molded into plaques, the resin exhibits a Flexural modulus of 1066.4 MPa, a Flexural strength of 44.13 MPa and a heat distortion temperature (HDT@ 0.46 MPa of 118° C.) The resin is useful for extruding radio-opague tubing for use as venous catheters.

POLY(ESTER-CARBONATE)-POLYISOBUTYLENE BLOCK COPOLYMER EXAMPLE 12

Into a mixture of 55 gms (0.24 moles) of bisphenol-A, 400 ml. of water, 25 gms (0.0043 moles) of the dicarboxylic acid polymer prepared according to Example 1, supra., 1 ml. of triethylamine and 500 ml. of methylene chloride contained in an appropriate reaction vessel and brought to a pH of from 10.5 to 11.5 by the addition of 50% aqueous sodium hydroxide, there is introduced phosgene at a rate of 0.75 gm/minute for 8 minutes. Then there is slowly added a mixture of 16 gms (0.079 moles) of isophthaloyl dichloride and 8 gms (0.039 moles) of terephthaoloyl dichloride in a solution of methylene chloride. After stirring for 5 minutes, the pH is stabilized between 10.5 and 11.5 and phosgene is introduced again at a rate of 0.75 gms/minute for 14 minutes. The resulting mixture is diluted with 500 ml. of methylene chloride. The resin layer is separated from the brine layer and washed with 0.01N HCl followed by two washings with deionized water. There resin is precipitated with steam and dried at 95° C. to obtain a block copolymer characterized in part by an intrinsic viscosity of 0.91 dl/g and a Tg of 162° C. and −71° C. The resin is elastomeric and useful to mold belting.

Example 13

A dry, 4-necked, 1000 ml. round bottom flask fitted with a paddle stirrer, nitrogen gas inlet, condenser and a thermometer is charged with 600 ml. of methylene chloride, 30.45 gms (0.15 moles) of isophthaloyl dichloride, 10.15 gms (0.05 moles) of terephthaloyl dichloride and 72 gms (0.012 moles) of the diacyl chloride polymer prepared in accordance with Example 3, supra. With stirring there is added 48.4 gms (0.212 moles) of bisphenol-A and 40 gms. (0.54 moles) of calcium hydroxide. The flask is then placed in a water bath maintained at a temperature of 20° C. and 100 μl of triethylamine is added. Stirring is continued for 4 hours and then the reaction mixture is diluted with 1 liter of chloroform and filtered through a Celite bed. The filtrate is washed with 500 ml. of 5% HCl and then with water, three times. The polymer product is coagulated in methanol and washed twice with methanol. After air drying, the resin is dried further in a vacuum oven at a temperature of 125° C. to obtain 110 gms of product resin having an intrinsic viscosity of 0.89 dl/g (phenol/TCE) and a Tg of 171° C. and −70° C. When compression molded at a temperature of 305° C. into a 1.16″ plaque, a clear and flexible material is obtained having a tensile modulus of 179.3 MPa, a tensile strength of 42.7 MPa and an elongation at break of 400%.

Example 14

Repeating the general procedure of Example 13, supra. but changing the proportions of charged reaction mixture ingredients to the following proportions:

| REAGENT | Proportion | Moles |
| --- | --- | --- |
| isophrhaloyloichloride | 20.3 g. | 0.10 |
| terephrhaloyldichloride | 20.3 g. | 0.10 |
| diacylchloride | 35.0 g. | 0.006 |
| bisphenol - A | 47.03 g. | 0.206 |
| calcium hydroxide | 40 g. | |
| triethylamine | 100 ml. | |
| methylene chloride | 600 ml. | | there is obtained 98 gms of resin product characterized in part by an intrinsic viscosity of 0.82 dl/g and a Tg of 177° C. and −69° C. The resin is useful to mold thermoplastic articles such as decorative panels.

POLY(BUTYLENE TEREPHTHALATE)-POLYISOBUTYLENE BLOCK COPOLYMER

Example 15

A 1 liter resin kettle is charged with 180 gms (2.0 moles) of butanediol, 145 gms (0.025 moles) of the dicarbomethoxy polymer prepared in accordance with Example 4, supra. and 0.4 gms of tetraoctyltitanate catalyst. Under a stream of nitrogen gas, the charge is heated to a temperature of 200° C. for 3 hours. At the end of this time period, the temperature is lowered to 130° C. and 194 gms (1.0 moles) of dimethyl-terephthalate is added. A Dean-Stark trap is attached to the flask and the temperature of the reaction mixture is slowly increased to 165° C. and then to 240° C. with continuous removal of methanol. When no further methanol is evolved, vacuum is applied down to 0.5 mm at temperature up to 250° C. for 3.5 hours. At the end of this period of time the block copolymer is isolated and found to have an intrinsic viscosity of 0.99 dl/g (measured in a solution of 40 percent tetrachloroethane/60 percent phenol, w/w), a Tg of 218° C. and −70° C. A compression molded sample exhibits the following physical properties:

| | |
| --- | --- |
| Shore hardness (D)' | 50 |
| Tensile Strength | 34.5 MPa |
| Ultimate Elongation | 430% |
| Notched Izod | No Break |

The copolymer is useful as a gasketing material.

POLYETHERIMIDE-POLYISOBUTYLENE BLOCK COPOLYMER

Example 16

A dry 4-necked, 1000 ml. round bottom flask fitted with a paddle stirrer, nitrogen inlet condenser and a thermometer is charged with 400 ml. of chloroform, 70 gm (0.0121 moles) of the diacyl chloride polymer prepared in Example 3, supra. and 50 g. (0.0137 moles) of a hydroxy-terminated polyetherimide prepared following the procedure of Example 1, U.S. Pat. No. 4,611,048 and having an OH equivalent number of 2462, an intrinsic viscosity of 0.18 dl/g and a number average molecular weight (Mn) of 3660. The charge is mixed by stirring and 15 g. (0.20 moles) of calcium hydroxide added. The flask is then placed in a water bath maintained at a temperature of about 20° C. and 50 μl of triethylamine added to the reaction mixture. The resulting mixture is stirred for 4 hours, then diluted with 1 liter of chloroform. The diluted mixture is filtered through a Celite bed and the clear filtrate washed with 500 ml. of 5 percent hydrochloric acid and then three times with water (final pH=6-7). A polymer product is precipitated with the addition of methanol. Separated by filtration, the precipitate is washed twice with methanol and dried in a vacuum oven at a temperature of 125° C. to obtain a thermoplastic block copolymer elastomer of poly(etherimide)-polyisobutylene found to have a Tg of 201° C. and −68° C. and an intrinsic viscosity of 0.79 dl/g. When dissolved in chloroform and film cast, the film is characterized by a tensile modulus of 62 MPa, a tensile strength of 7.6 MPa and a yield elongation of greater than 100 percent. The resin is useful as a high temperature resistant molding resin for fabricating structural components.

A POLYAMIDE-POLYISOBUTYLENE COPOLYMER

Example 17

A copolymer is prepared with the following reactants:

|  | Equivalent % |
| --- | --- |
| polymeric diacid of formula (III) prepared according to Example 1, supra. | 50 |
| sebacic acid | 50 |
| piperazine | 65 |
| ethylene diamine | 35 |

The reactants are all charged in a resin kettle and refluxed at a temperature of 120°–150° C. with stirring, under a blanket of nitrogen gas for 3 hours. The mixture is then heated gradually from reflux temperature to 200° C. while water is removed by distillation. Six drops of phosphoric acid are added, and the mixture is heated at temperatures of 220°–240° C. under a vacuum of 0.05 to 5 mm Hg for 3 hours.

The resulting copolymer resin is allowed to cool to room temperature and representative portions are taken and found to have properties useful as hot-melt adhesives.

POLY(ESTER-AMIDE)-POLYISOBUTYLENE COPOLYMER

Example 18

A copolymer is prepared with the following reactants:

|  | Grams | Equivalents |
| --- | --- | --- |
| polymeric diacid prepared according to Example 2, supra. | 57.0 | .201 |
| sebacic acid | 184.2 | 1.82 |
| piperazine | 84.2 | 1.95 |
| 1,4-cyclohexane dimethanol | 15.3 | .21 |
| stearic acid | 14.8 | .06 |

The reactants are all charged in a resin kettle and refluxed at a temperature of 138°–160° C. with stirring, under a blanket of nitrogen gas for 3 hours. The mixture is then heated gradually from reflux temperature to 225° C. while water is removed by distillation. Six drops of phosphoric acid are added, and the mixture is heated at temperatures of 210°–235° C. under a vacuum of 0.05 to 1 mm Hg for 3 hours. At the end of this time 3.0 grams of stearic acid is added to the polymer melt, and the melt is stirred for 40 minutes under a nitrogen purge. Full vacuum (1 mm) is then applied to the melt for an additional 40 minutes. After the vacuum cycle, the product is cast onto a Teflon coated glass sheet and allowed to cool. The resin is useful as an adhesive to bond vinyl films.

What is claimed is:

1. A polycarbonate-polyisobutylene block copolymer having recurring or repeating structural units of the formula:

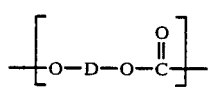

wherein D is a divalent aromatic radical of a dihydric phenol, interrupted by at least one divalent moiety of the formula:

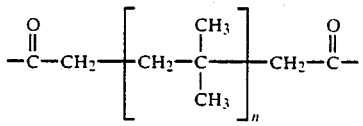

wherein n is an integer such that the moiety has a molecular weight contribution of from 5,000 to 30,000 Daltons as determined by gel permeation chromatography.

2. A polycarbonate-polyisobutylene block copolymer having recurring or repeating chain units of the formula:

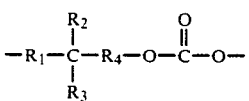

wherein $R_1$ and $R_4$ are each selected from the group consisting of a divalent aromatic hydrocarbon radical, a divalent, halogen-substituted aromatic hydrocarbon radical, and a divalent alkyl-substituted aromatic hydrocarbon radical; and $R_2$ and $R_3$ are each selected from the group consisting of hydrogen and alkyl; said recurring or repeating chain units being interrupted by at least one divalent moiety of the formula:

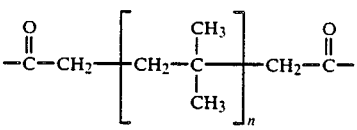

wherein n represents an integer such that the divalent moiety has a molecular weight withing the range of from 5,000 to 30,000 as determined by gel permeation chromatography.

3. A copolyester-carbonate-polyisobutylene copolymer having
recurring structural units selected from structural units represented by the formulae:

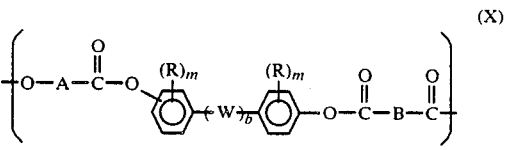

wherein R is independently selected from halogen, hydrocarbyl, or monovalent hydrocarbonoxy radicals;

W is selected from divalent hydrocarbon radicals, —O—, —S—, —S—S,

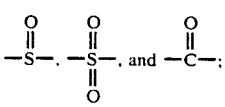

A is the divalent residue of at least one polymerized conjugated alkadiene having a weight average molecular weight of at least about 600;

m is independently selected from integers having a value of from 0 to 4;

b is either zero or one; and

B is the divalent residue of an ester precursor; said units being interrupted by at least one divalent moiety of the formula:

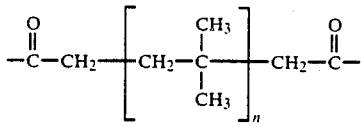

wherein n is an integer such that the divalent moiety has a molecular weight contribution of from 5,000 to 30,000 Daltons as determined by gel permeation chromatography.

4. The resin of claim 3 wherein said ester precursor is selected from difunctional carboxylic acids or their ester forming reactive derivatives.

5. The resin of claim 4 wherein said difunctional carboxylic acids or their ester forming reactive derivatives are selected from aromatic difunctional carboxylic acids or their ester forming reactive derivatives.

6. The resin of claim 5 wherein said aromatic ester forming reactive derivatives are selected from isophthaloyl dichloride, terephthaloyl dichloride, or mixtures thereof.

7. A poly(ester-amide)-isobutylene block copolymer which comprises: the product of the polymerization of
(a) from 10 to 60 equivalent percent of a polymeric diacid of the formula:

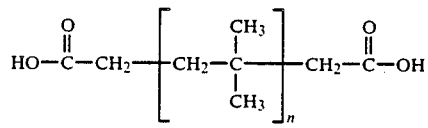

wherein n is an integer such that the diacid has a weight average molecular weight of from 5,000 to 30,000 determined by gel permeation chromatography;
(b) from 40 to 90 equivalent percent of a dicarboxylic acid; with a substantially equivalent amount of
(c) from 40 to 90 equivalent percent of an organic diamine and
(d) from 10 to 60 equivalent percent of a diol.

8. A polyamide-polyisobutylene copolymer which is the polymerization reaction product of a compound of the formula:

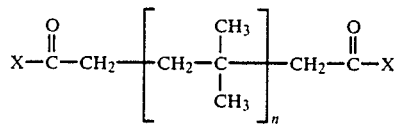

wherein X represents a group selected from one of hydroxyl, halogen and alkoxy and n is an integer such that the compound has a weight average molecular weight of from 5,000 to 30,000 determined by gel permeation chromatography; with a polyamine.

9. A polyester-polyisobutylene block copolymer which is the polymerization reaction product of a compound of the formula:

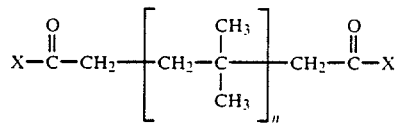

wherein X represents a group selected from one of hydroxyl, halogen and alkoxy and n is an integer such that the compound has a weight average molecular weight of from 5,000 to 30,000 determined by gel permeation chromatography.

10. A polyarylate-polyisobutylene block copolymer which is the polymerization reactioin product of a dihydric phenol of the formula:

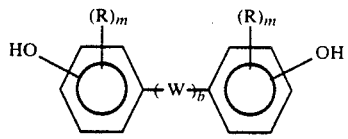

wherein:
each R is independently selected from halogen, hydrocarbyl and monovalent hydrocarbonoxy radicals;
W is selected from divalent hydrocarbon radicals, —O—, —S—, —S—S—,

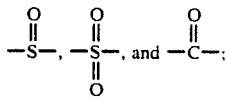

each m is independently selected from whole numbers having a value of from 0 to 4 inclusive; and
b is either zero or one; with a substantially equimolar proportion of a mixture of a polymeric dicarboxylic acid of the formula:

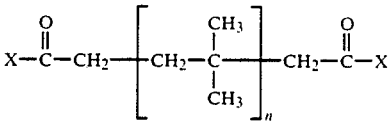

wherein X represents hydroxyl halogen and alkoxy and n is an integer such that the polymeric dicarboxylic acid has a weight average molecular weight of from 5,000 to 30,000 determined by gel permeation chromatography; and an aromatic dicarboxylic acid of the formula:

HOOC—R'—COOH wherein R' represents a divalent aromatic radical.

11. A polyetherimide-polyisobutylene copolymer which is the polymerization reaction product of a polymeric compound of the formula:

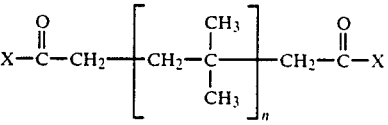

wherein X is selected from a group consisting of hydroxyl, halogen and alkoxy and n is an integer such that the compound has a weight average molecular weight of from 5,000 to 30,000 determined by gel permeation chromatography; with a reactive polyetherimide.

* * * * *